United States Patent [19]

Carpenter et al.

[11] Patent Number: 5,133,021

[45] Date of Patent: Jul. 21, 1992

[54] SYSTEM FOR SELF-ORGANIZATION OF STABLE CATEGORY RECOGNITION CODES FOR ANALOG INPUT PATTERNS

[75] Inventors: Gail Carpenter; Stephen Grossberg, both of Newton Highlands, Mass.

[73] Assignee: Boston University, Boston, Mass.

[21] Appl. No.: 486,095

[22] Filed: Feb. 28, 1990

Related U.S. Application Data

[63] Continuation-in-part of Ser. No. 64,764, Jun. 19, 1987, Pat. No. 4,914,708, and a continuation-in-part of Ser. No. 464,247, Jan. 12, 1990.

[51] Int. Cl.[5] .............................................. G06K 9/00
[52] U.S. Cl. ...................................... 382/15; 395/100
[58] Field of Search .................... 382/14, 15; 364/513, 364/274.9

[56] References Cited

U.S. PATENT DOCUMENTS

| 3,601,811 | 8/1971 | Yoshino | 382/15 |
| 3,950,733 | 4/1976 | Cooper et al. | 382/15 |
| 4,479,241 | 10/1984 | Buckley | 382/15 |
| 4,760,604 | 7/1988 | Cooper et al. | 382/36 |
| 4,773,024 | 9/1988 | Faggin et al. | 382/15 |

OTHER PUBLICATIONS

Carpenter, G. A. & Grossberg, S., "The Art of Adaptive Pattern Recognition by a Self-Organizing Neural Network," Computer, Mar. 1988, pp. 77-88.

Carpenter, G. A. & Grossberg, S., "Art 2: self-organization of stable category recognition codes for analog input patterns," Applied Optics, vol. 26, No. 23, Dec., 1987, pp. 4919-4930.

*Primary Examiner*—Leo H. Boudreau
*Attorney, Agent, or Firm*—Hamilton, Brook, Smith & Reynolds

[57] ABSTRACT

A neural network includes a feature representation field which receives input patterns. Signals from the feature representative field select a category from a category representation field through a first adaptive filter. Based on the selected category, a template pattern is applied to the feature representation field, and a match between the template and the input is determined. If the angle between the template vector and a vector within the representation field is too great, the selected category is reset. Otherwise the category selection and template pattern are adapted to the input pattern as well as the previously stored template. A complex representation field includes signals normalized relative to signals across the field and feedback for pattern contrast enhancement.

26 Claims, 8 Drawing Sheets

SYSTEM FOR SELF-ORGANIZATION OF STABLE CATEGORY RECOGNITION CODES FOR ANALOG INPUT PATTERNS

GOVERNMENT SUPPORT

This invention was made with government support and the government has certain rights in the invention.

This research was supported in part by the Air Force Office of Scientific Research (AFOSR F49620-86-C-0037 and AFOSR 85-1049), the Army Research Office (ARO DAAG-29-85-K-0095), and the National Science Foundation (NSF DMS-86-11959 (G.A.C.) and NSF IRI-84-17756 (S.G.)).

RELATED APPLICATION

This application is a continuation-in-part of co-pending U.S. application, Ser. No. 07/064,764 filed Jun. 19, 1987, now U.S. Pat. No. 4,914,708 and a continuation-in-part of a co-pending application Ser. No. 464,247, filed Jan. 12, 1990.

BACKGROUND OF THE INVENTION

Adaptive resonance architectures are neural networks that self-organize stable recognition categories in real time in response to arbitrary sequences of input patterns. The basic principles of a adaptive resonance theory (ART) were introduced in Grossberg, "Adaptive pattern classification and universal recoding, II: Feedback, expectation, olfaction, and illusions." *Biological Cybernetics*, 23 (1976) 187-202. A class of adaptive resonance architectures has since been characterized as a system of ordinary differential equations by Carpenter and Grossberg, "Category learning and adaptive pattern recognition: A neural network model," *Proceedings of the Third Army Conference on Applied Mathematics and Computing*, ARO Report 86-1 (1985) 37-56, and "A massively parallel architecture for a self-organizing neural pattern recognition machine." *Computer Vision, Graphics, and Image Processing*, 37 (1987) 54-115. One implementation of an ART system is presented in U.S. application No. PCT/US86/02553, filed Nov. 26, 1986 by Carpenter and Grossberg for "Pattern Recognition System".

As shown in FIG. 1, ART networks encode new input patterns received at 20, in part, by changing the weights, or long term memory (LTM) traces, of a bottom-up adaptive filter 22. This filter is contained in pathways leading from a feature representation field ($F_1$) to a category representation field ($F_2$) of short term memory. This bottom-up filtering property is shared by many other models of adaptive pattern recognition and associative learning. In an ART network, however, it is a second, top-down adaptive filter 24 that leads to the crucial property of code self-stabilization. The top-down filtered inputs to $F_1$ form a template pattern and enable the network to carry out attentional priming, pattern matching, and self-adjusting parallel search.

The fields $F_1$ and $F_2$, as well as the bottom-up and top-down adaptive filters, are contained within the ART's attentional subsystem. An auxiliary orienting subsystem 26 becomes active when a bottom-up input to $F_1$ fails to match the learned top-down template from filter 24 corresponding to the active category representation at $F_2$. In this case, the orienting subsystem rapidly resets the active category representation. This reset automatically induces the attentional subsystem to proceed with a parallel search. Alternative categories are tested until either an adequate match is found or a new category is established. The search remains efficient because the search strategy through filter 22 is adaptively updated throughout the learning process. The search proceeds rapidly relative to the learning rate. Thus significant changes in the bottom-up and top-down adaptive filters occur only when a search ends and a matched $F_1$ pattern resonates within the system. The system carries out a search during many initial input trials. Thereafter, however, the search mechanism is automatically disengaged, with each input having direct access to its category representation.

In principle, any new input could create a new category at any time: plasticity, or the potential for change in the LTM, remains intact indefinitely. If at any time, for example, a new input were added to the previously learned set, the system would search the established categories. If an adequate match were found, the LTM category representation would be refined, if necessary, to incorporate the new pattern. If no match were found, a new category would be formed, with previously uncommitted LTM traces encoding the STM pattern established by the input. Nevertheless, the code does tend to stabilize as the category structure becomes increasingly complex, since then each new pattern becomes increasingly likely to fit into an established category.

The criterion for an adequate match between an input pattern and a chosen category template is adjustable. The matching criterion is determined by a vigilance parameter that controls activation of the orienting subsystem 26. All other things being equal, higher vigilance imposes a stricter matching criterion, which in turn partitions the input set into finer categories. Lower vigilance tolerates greater top-down/bottom-up mismatches at $F_1$, leading in turn to coarser categories. In addition, at every vigilance level, the matching criterion is self-scaling: a small mismatch may be tolerated if the input pattern is complex, while the same featural mismatch would trigger reset if the input represented only a few features.

The orienting subsystem is one of the means by which an ART network carries out active regulation of the learning process. Attentional gain control 28 and 30 at $F_1$ and $F_2$ also contributes to this active regulation. Gain control acts to adjust overall sensitivity to patterned inputs and to coordinate the separate, asynchronous functions of the ART systems.

DISCLOSURE OF THE INVENTION

Architectures of the present invention are designed for the processing of analog, as well as binary, input patterns. The basic ART architecture is adapted to meet the particular demands of analog inputs. With two binary inputs, a difference in just one element could signal a significant difference between the patterns; prior systems would note this distinction if vigilance were very high. In contrast, two analog patterns may be arbitrarily close together. Also in contrast to binary inputs, a given analog signal could be sitting atop various levels of background activity. A category representation system for analog inputs needs to be able to pick out similar signals embedded in various noisy backgrounds. Finally, different types of input patterns have different processing requirements. How inputs are classified is a function of the system's signal functions and parameters, as well as the vigilance level.

In order to match and learn sequences of analog input patterns in a stable fashion, $F_1$ is split into multiple processing levels and gain control systems. Bottom-up input patterns and top-down signals are received at different locations in $F_1$. Positive feedback loops within $F_1$ enhance salient features and suppress noise. The multiple $F_1$ levels buffer the network against incessant recoding of the category structure as new inputs are presented. Pattern matching is by the angle between pattern vectors. In contrast, the LTM equations are simpler than those of prior systems.

More specifically, a pattern recognition neural network of the present invention comprises a short term feature representation field for receiving input signals defining an input pattern and template signals defining a long term memory template. At least one category is selected based on a pattern from the short term field, and a long term template is generated based on the selected category. Category selection and the long term memory template are adapted to the input signals.

Preferably, a category selection is reset with an insufficient match between the input pattern and template. The match is based on the closeness between a vector of the template and a vector of the short term field as indicated by an angle between the two vectors. The angle of the two vectors is disregarded and reset is avoided where a category has not been previously selected. That result can be obtained by basing the match on a norm of weighted sums, each sum being of the short term signal and a template signal. Preferably, the summmed short term signal is normalized relative to other like signals of the short term field.

In a preferred system, the short term field comprises a plurality of subfields of short term signals, and feedback is provided between short term signals within the short term field. The feedback may provide for an enhancement of higher level signals of the input relative to lower level signals. Feedback of template signals within the short term field may also be provided. More specifically, feedback may be of the sum of a short term signal and a template signal.

Category selection and the long term memory template may be adapted as dual functions of a difference between a template signal and a matched signal. Each matched signal of a matched pattern is a weighted sum of a short term signal in the field and a template signal. The short term signal may be normalized relative to other like signals of the short term field. Normalization is obtained for signals of at least one subfield of a short term field; normalization is based on an input signal specific to the short term signal and also on a nonspecific signal generated from across the short term field.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
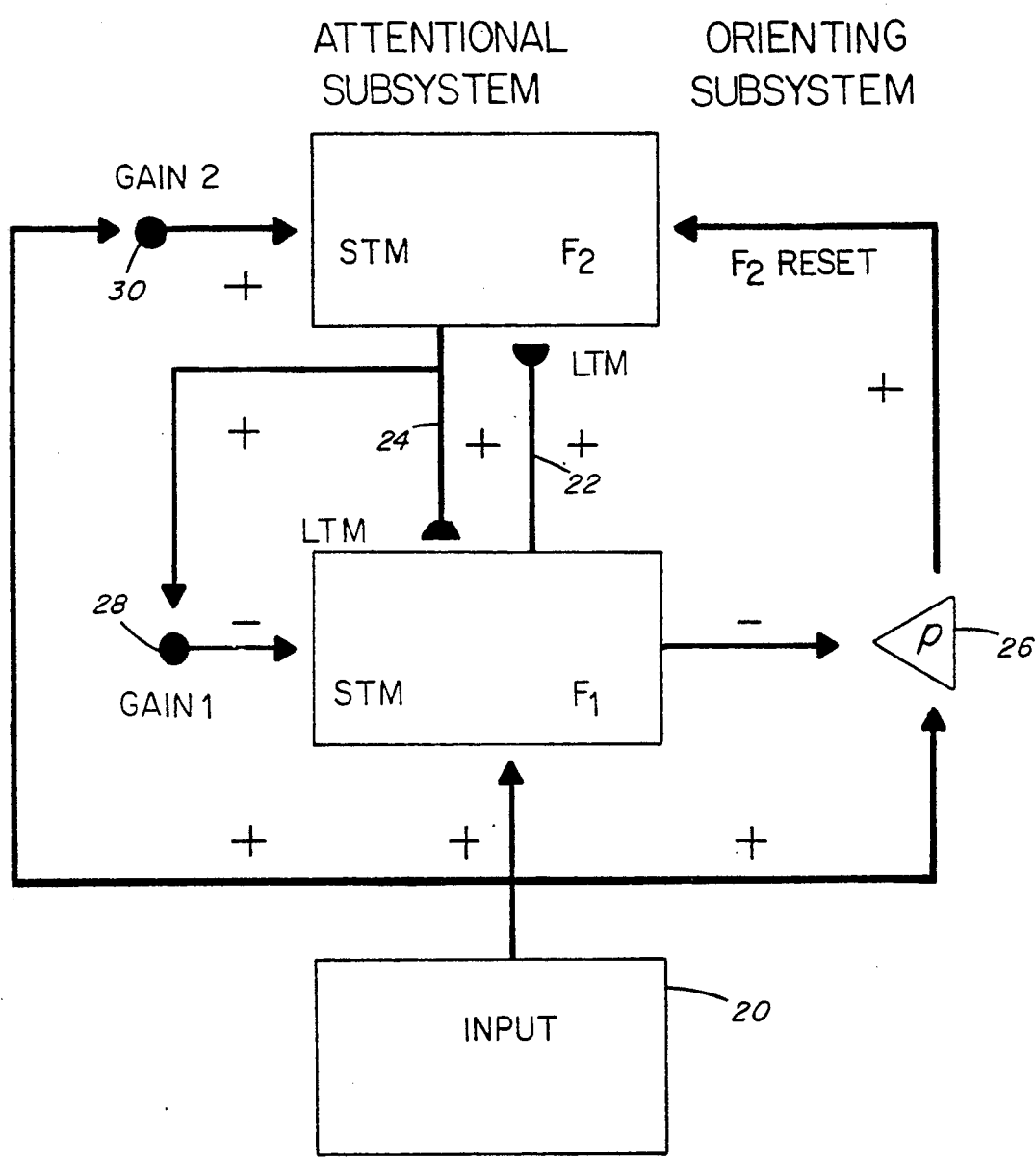
FIG. 1 is a block diagram of a conventional ART system.
Figure 2:
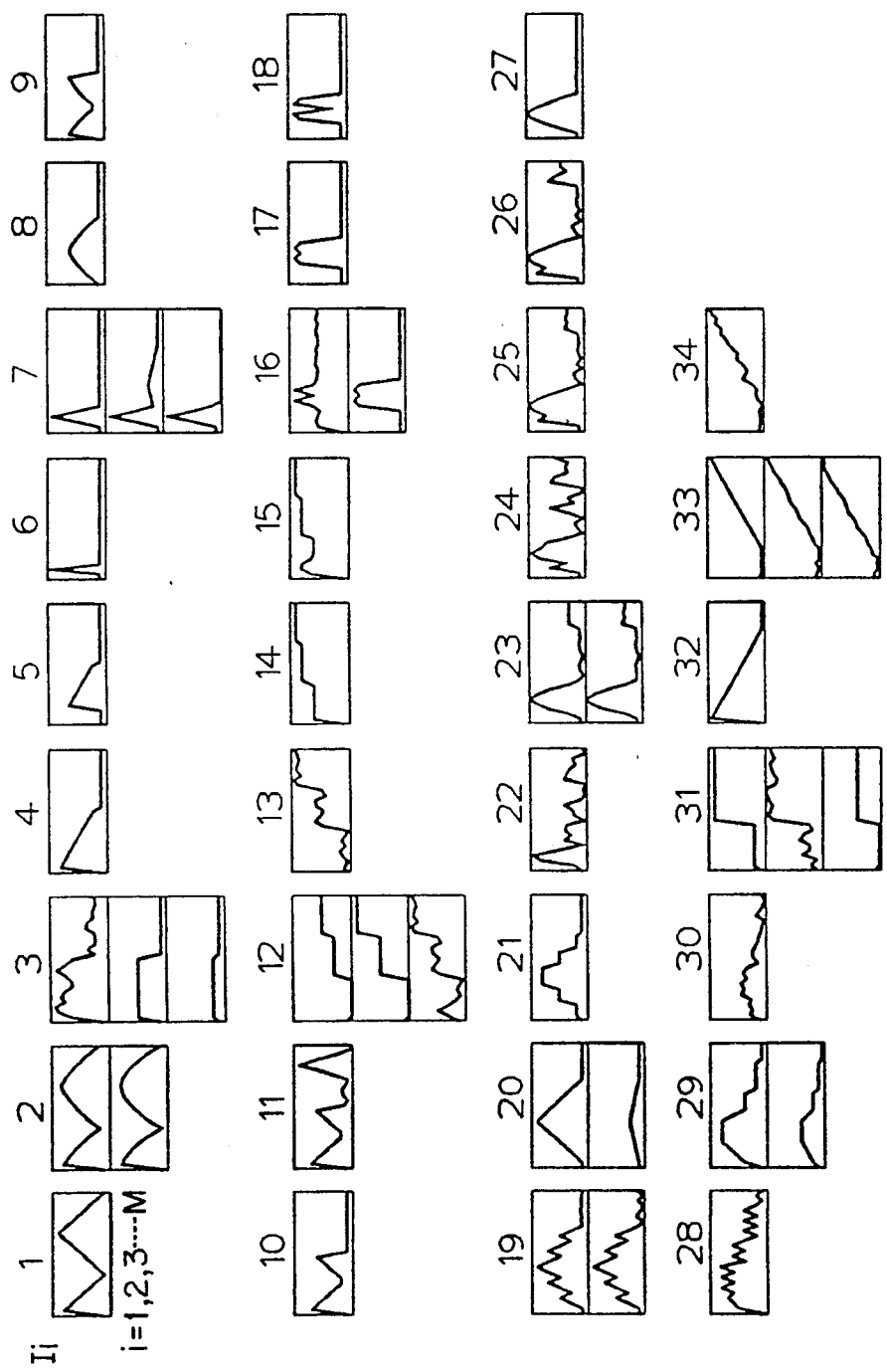
FIG. 2 illustrates categorization of 50 analog patterns in 34 categories utilizing a system embodying the present invention.

FIG. 2 illustrates a set of 50 patterns which have been categorized by a system embodying the present invention. As illustrated with respect to the pattern in category one, each pattern is a plot of an input signal $I_i$ against a set of input nodes i (i = 1 through M) which are applied in parallel to the feature representation field $F_1$. The pattern may, for example, be a spatial pattern across spatial inputs. Or the pattern may be temporal with the intensity $I_i$ plotted against time $T_i$.

Figure 8:
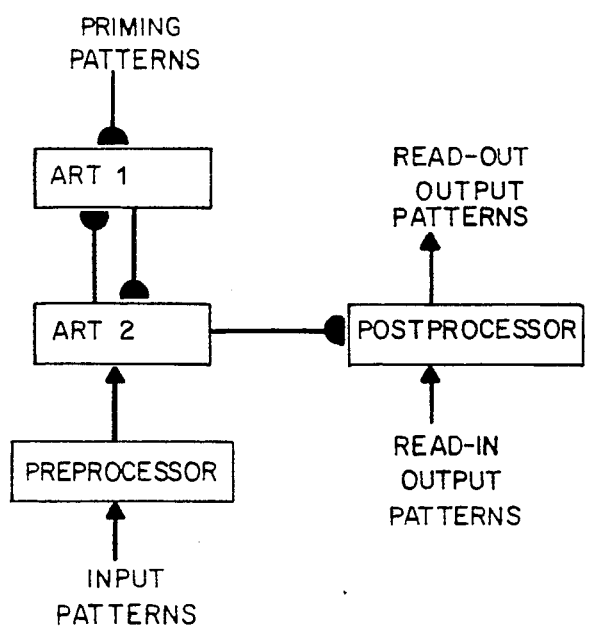
FIG. 8 illustrates an architecture utilizing the system of FIG. 4.

It can be seen that the system recognizes like patterns despite noise. For example, in category 3 a high frequency noise pattern is superimposed over the first pattern. It can be seen in category sixteen that the system ignored an underlying level of background noise. In category 3, it can be seen from the second and third patterns that the system recognized two like patterns even though one was amplified relative to the other. From categories sixteen and seventeen, it can be seen that two seemingly like patterns have been separately categorized. This is due to the relative displacement of the two patterns along with the i axis. Such displacement can be ignored by the system by preprocessing the input pattern as later described with respect to FIGS. 8 and 9.

Figure 3:
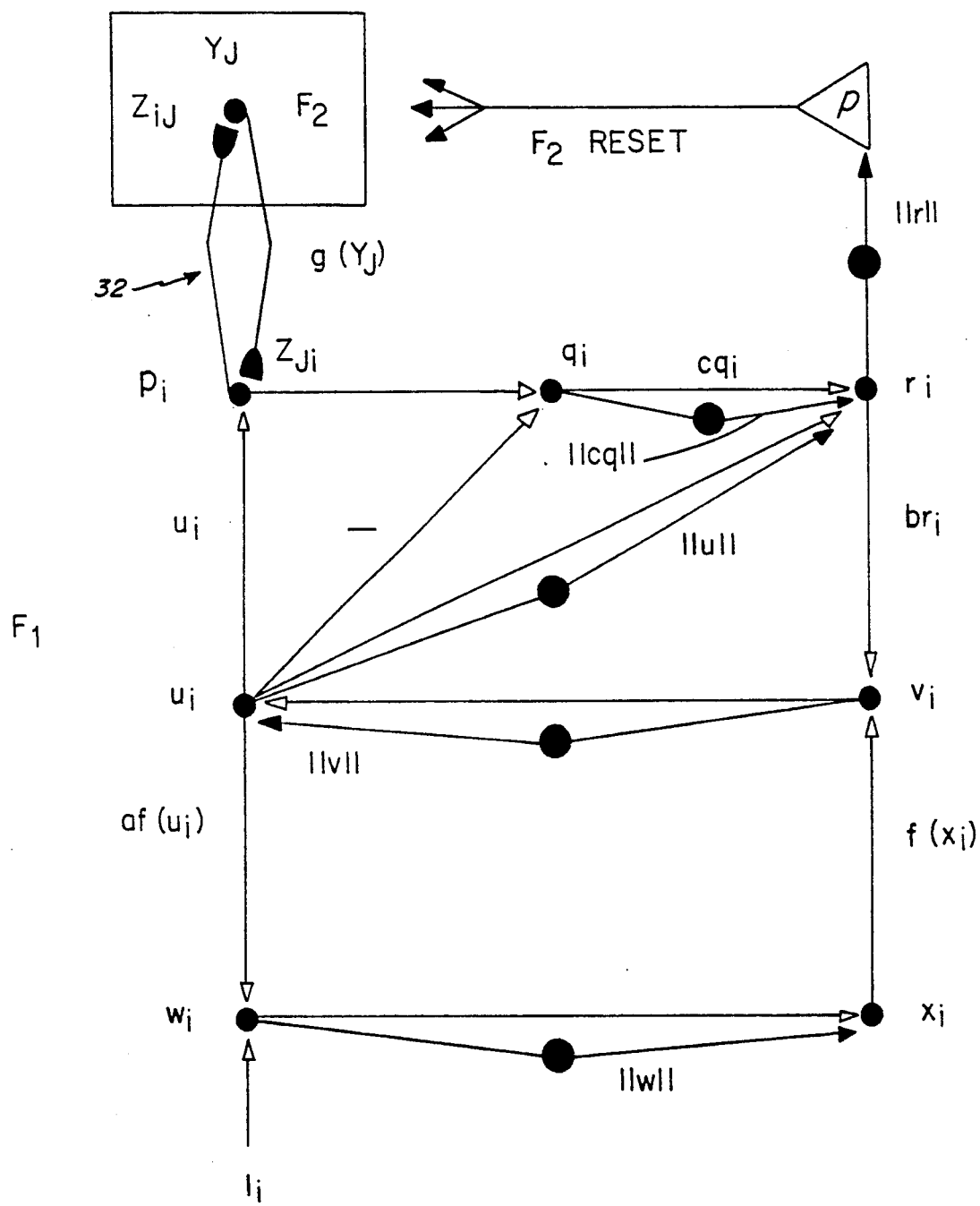
FIG. 3 illustrates a circuit for processing the signal received at a single input node of $F_1$ and from a single selected category of $F_2$ in a system embodying the present invention.
Figure 4:
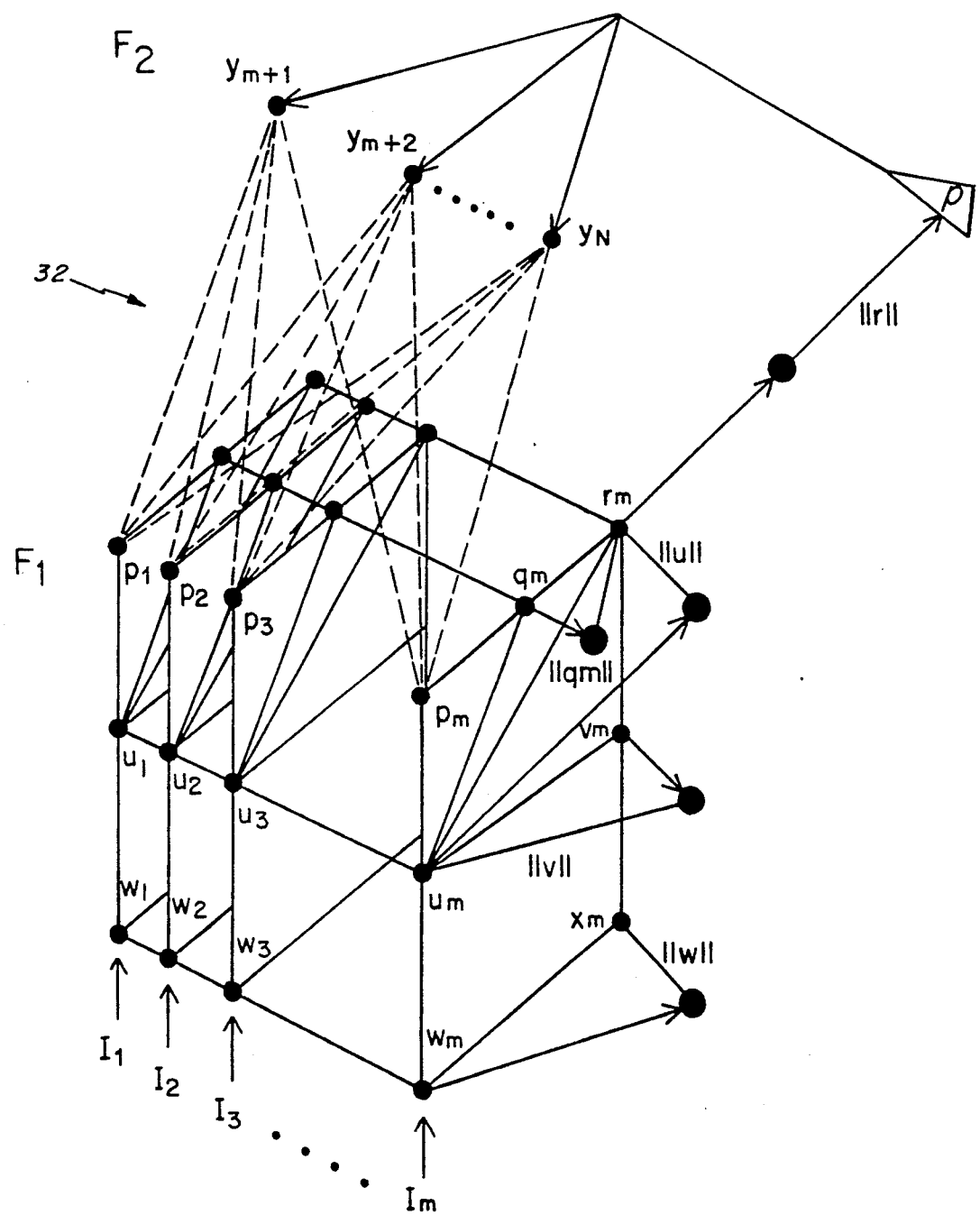
FIG. 4 illustrates a full system utilizing the circuit of FIG. 3.

The architectural difference between the system embodying the present invention and prior ART systems is illustrated in FIGS. 3 and 4. In prior systems, a simple match was made between incoming signals and a previously learned top-down patterns. That approach was suitable for binary patterns but had shortcomings when applied to analog patterns. It can be seen in FIGS. 3 and 4 that the field $F_1$ has been split into a set of multiple processing levels and gain control circuits, one such circuit associated with each input $I_i$ to $F_1$. Across the $F_1$ field, a set of signals $w_i$, for example, defines a subfield.

Each of the large circles of FIG. 3 represents the computation of the $L_2$-norm of all the signals of a particular subfield. For example, the $L_2$-norm of a w is defined as:

$$\|w\| = \left( \sum_{i=1}^{M} w_i^2 \right)^{\frac{1}{2}}$$

Each of the smaller circles denotes a computation which is further described below to generate each of the subfield signals $w_i$, $x_i$, $v_i$, $u_i$, $p_i$, $q_i$ and $r_i$. The clear arrow heads denote inputs to the several computations which are specific to a particular input signal $I_i$ and a particular matching signal $p_i$. Solid arrowheads denote nonspecific inputs based on signals of a full subfield. Those nonspecific inputs are taken from the computations shown to the right of FIG. 4.

The signal $p_i$ communicates through adaptive filters with $F_2$. In FIG. 3, a single pair of filters pathways is shown between a single signal $p_i$ and a single node $Y_J$ in $F_2$. Such a pair is connected between each signal $p_i$ and each category node $y_j$ of $F_2$. This is indicated by the broken lines of FIG. 4 where each broken line represents a pair of filter elements. In the bottom-up adaptive filter each signal $p_i$ is multiplied by a weight $Z_{ij}$ indicated by the size of a hat on the line leading to the $F_2$ node. Also, each signal from a node $y_j$ is multiplied by a weight $z_{ji}$ and applied to a signal $p_i$.

As in conventional ART systems the weighted inputs from $F_1$ select at least one category of $F_2$. Where only a single category node is chosen, only that node ($y_J$) applies a signal through the vectors of weights $z_J = (z_{J1}, \ldots z_{Jm})$ to any number of nodes in $F_1$. The received signals represent a previously learned template pattern. $F_1$ must then match the previously learned pattern with the incoming pattern in a manner which will be discussed below. If a sufficient match is found, the previously learned pattern may be modified by modifying the weights of both the bottom-up and top-down filter elements leading to and from the selected category node to incorporate information of the new incoming pattern. If the match is insufficient, the orienting subsystem resets the $F_2$ field to disable the previously selected node, and subsequent nodes are chosen through a search. Finally, when an adequate match is found with a selected category, which may be a previously unlearned category, the filter coefficients $z_{iJ}$ and $z_{Ji}$ are adapted to the present input.

The field $F_1$ of the architecture illustrated in FIGS. 3 and 4 automatically computes several internal normalization, gain control, and matching operations. These operations work together to satisfy the multiple constraints needed to achieve realtime, asynchronous, stable, self-organizing category learning of arbitrary sequences of analog input patterns. In particular, without a teacher, the system needs to be able, on the one hand, to react to small differences between the active $F_1$ STM pattern and the LTM pattern of an established category; and, on the other hand, to be able to learn arbitrary new input patterns, without $F_2$ reset, when a new category is becoming established. Also, an input needs to be able to directly activate its category representation, should an adequate match exist; read-out of the top-down template pattern needs to maintain the bottom-up category choice in either a match or a mismatch situation, so that $F_2$ reset is controlled entirely by mismatch-mediated activation of the orienting subsystem; learning of a matched pattern also needs to maintain the original bottom-up choice; all the properties outlined in the Background need to be achieved; and all computations need to be carried out locally.

The potential, or STM activity, $V_i$ of the $i^{th}$ node at any one of the $F_1$ processing stages obeys a membrane equation (Hodgkin and Huxley, 1952) of the form $$\epsilon \frac{d}{dt} V_i = -AV_i + (1 - BV_i)J_i^+ - (C + DV_i)J_i^- \quad 1$$

($i = 1 \ldots M$). Term $J_i^+$ is the total excitatory input to the with node and $J_i^-$ is the total inhibitory input. In the absence of all inputs, $V_i$ decays to 0. The dimensionless parameter represents the ratio between the short STM relaxation time and the long LTM relaxation time. With the LTM rate $0(1)$, then $$0 < \epsilon 1 \quad 2$$

Also, $B \equiv O$ in the $F_1$ equations of the present system. Thus the STM equations, in the singular form as $\epsilon \rightarrow 0$, are:

$$V_i = \frac{J_i^+ - CJ_i^-}{A + DJ_i^-}. \quad 3$$

In this form, the dimensionless equations (4)–(10) characterize the STM activities, $p_i$, $q_i$, $r_i$, $u_i$, $v_i$, $w_i$, and $x_i$, computed within $F_1$:

$$w_i = a_i(I_i + af(u_i)) \quad 4$$

$$x_i = \frac{w_i}{e + ||w||} \quad 5$$

$$v_i = f(x_i) + br_i \quad 6$$

$$u_i = \frac{v_i}{e + ||v||} \quad 7$$

$$p_i = u_i + \sum_j g(y_j) z_{ji} \quad 8$$

$$q_i = p_i - u_i \quad 9$$

$$r_i = \frac{u_i + cq_i}{e + ||u|| + ||cq||}. \quad 10$$

where $//V//$ denotes the $L_2$-norm of the vector $V$ and where $y_j$ is the STM activity of the $j^{th}$ $F_2$ node. The nonlinear signal function f in equations (4) and (6) is typically of the form $$f(x) = \begin{cases} x & \text{if } x \geq \theta \\ \frac{2\theta x^2}{(x^2 + \theta^2)} & \text{if } 0 \leq x \leq \theta, \end{cases} \quad 11$$

which is continuously differentiable, or $$f(x) = \begin{cases} x & \text{if } x \geq \theta \\ 0 & \text{if } 0 \leq x < \theta, \end{cases} \quad 12$$

which is piecewise linear. The principal free parameters of the model are a, b, and $\theta$.

The category representation field $F_2$ is the same as in prior ART systems. The key properties of $F_2$ are contrast enhancement of the filtered, patterned $F_1 \rightarrow F_2$ input; and reset, or enduring inhibition, of active $F_2$ nodes whenever a pattern mismatch occurs at $F_1$.

Contrast enhancement may be carried out, for example, by competition within $F_2$. Choice is the extreme case of contrast enhancement. $F_2$ makes a choice when the node receiving the largest total input quenches activity in all other nodes. In other words, let $T_j$ be the summed filtered $F_1 \rightarrow F_2$ input to the $j^{th}$ $F_2$ node:

$$T_j = \sum_i p_i z_{ij} \qquad (13)$$

(j = M+1 ... N), then $F_2$ makes a choice if, when $$T_J = \max\{T_j : J = M+1 ... \}, \qquad (14)$$

the $J^{th}$ $F_2$ node becomes maximally active while all other nodes are inhibited.

$F_2$ reset may be carried out in several ways, one being use of a gated dipole field network in $F_2$. When a nonspecific arousal input reaches an $F_2$ gated dipole field, nodes are inhibited or reset in proportion to their former STM activity levels. Moreover, this inhibition endures until the bottom-up input to $F_1$ shuts off. Such a nonspecific arousal wave reaches $F_2$, via the orienting subsystem, when a mismatch occurs at $F_1$.

When $F_2$ makes a choice, the main elements of the gated dipole field dynamics may be characterized as:

$$g(y_j) = \begin{cases} d & \text{if } T_J = \max\{T_j : \text{the } j^{th} F_2 \text{ node has not been reset on the current trial}\} \\ 0 & \text{otherwise.} \end{cases} \qquad (15)$$

Equation (15) implies that (8) reduces to $$p_i = \begin{cases} u_i & \text{if } F_2 \text{ is inactive} \\ u_i + dz_{Ji} & \text{if the } J^{th} F_2 \text{ node is active.} \end{cases} \qquad (16)$$

the top-down and bottom-up LTM trace equations (17) and (18) are dual $$\text{Top-down, } F_2 \to F_1: \frac{d}{dt} z_{ji} = g(y_j)[p_i - z_{ji}] \qquad (17)$$

$$\text{Bottom-up, } F_1 \to F_2: \frac{d}{dt} z_{ij} = g(y_j)[p_i - z_{ij}]. \qquad (18)$$

If $F_2$ makes a choice, (14)–(18) imply that, if the $J^{th}$ $F_2$ node is active, then $$\frac{d}{dt} z_{Ji} = d[p_i - z_{Ji}] = d(1-d)\left[\frac{u_i}{1-d} - z_{Ji}\right] \qquad (19)$$

and $$\frac{d}{dt} z_{iJ} = d[p_i - z_{iJ}] = d(1-d)\left[\frac{u_i}{1-d} - z_{iJ}\right]. \qquad (20)$$

with $0 < d < 1$. If $j \ne J$, $dz_{ji}/dt = dz_{ij}/dt = 0$.

The orienting subsystem resets $F_2$ whenever $$\frac{\rho}{e + \|r\|} > 1, \qquad (21)$$

where the dimensionless vigilance parameter is set between 0 and 1.

In order to analyze a particular class of system, the following simplifying assumptions can be made:
i. $\alpha 1$ (equation (4));
ii. $e \equiv 0$ (equations (5), (7), (10) and (21));
iii. $F_2$ makes a choice (equations (13)–(15));
iv. $d \in (0,1)$ is fixed (equations (15), (16), (19), and (20)); and
v. $c \in$ $$\left(0, \frac{1-d}{d}\right)$$

is fixed (equation (10)).

Figure 6:
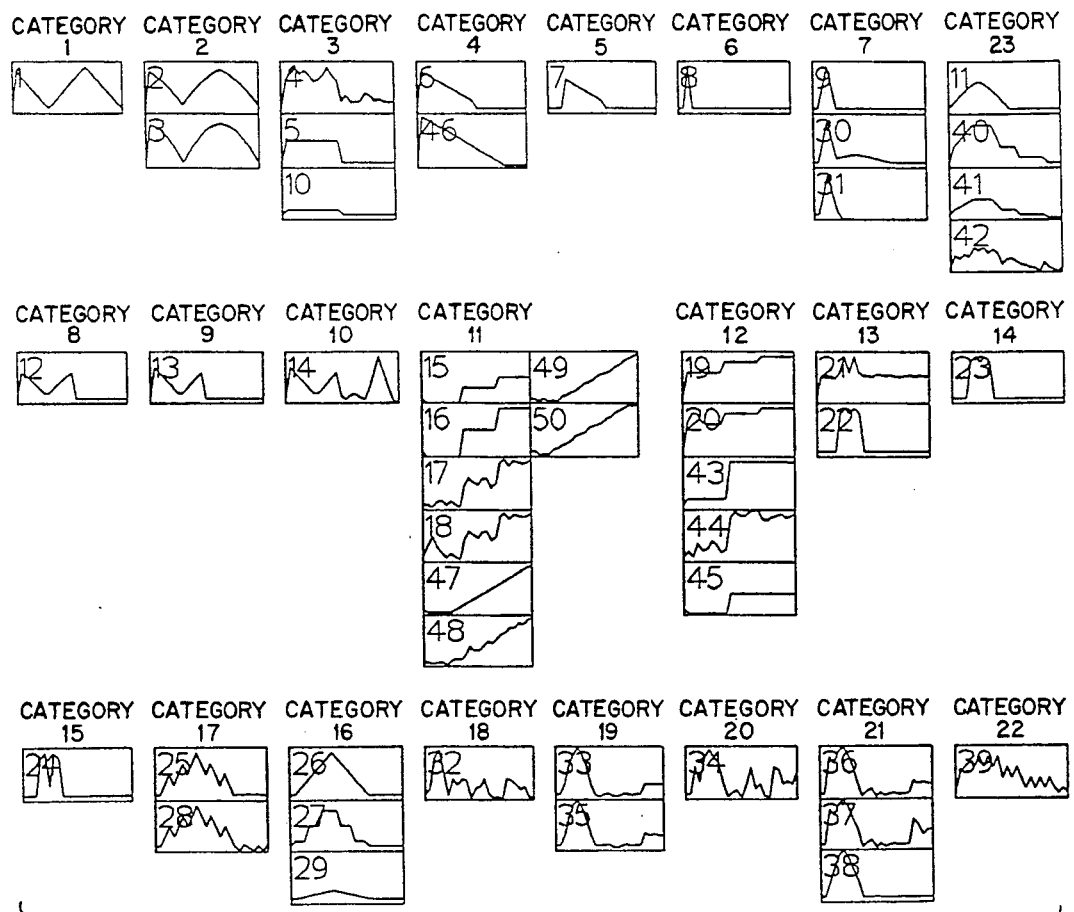
FIG. 6 illustrates the categorization of the 50 patterns of FIG. 2 but using a lower vigilance parameter.

The remaining five parameters are a (equation (4)); b (equation (6)); (equation (11) or equation (12)); and (equation (21)). The size of a determines the strength of the feedback from the second level to the first level of $F_1$ (FIG. 3). The size of b determines the strength of the feedback from the third level to the second level of $F_1$. The size of $\theta$ determines the degree of nonlinearity of the signal functions $f(x_i)$ and $f(u_i)$ between the first level and the second level of $F_1$. The size of $\rho$ determines the matching criterion, and hence the coarseness of category groupings (FIGS. 2 and 6).

With these simplifying assumptions, the system can be summarized as follows, letting $Z_J = (z_{J1}, \ldots, z_{Jm})$:

(i) seven $F_1$ subfields $$w_i = I_i + af(u_i) \qquad (22)$$

$$x_i = \frac{w_i}{\|w\|} \qquad (23)$$

$$v_i = f(x_i) + br_i \qquad (24)$$

$$u_i = \frac{v_i}{\|v\|} \qquad (25)$$

$$p_i = \begin{cases} u_i & \text{if } F_2 \text{ is inactive} \\ u_i + dz_{Ji} & \text{if the } J^{th} F_2 \text{ node is active} \end{cases} \qquad (26)$$

$$q_i = \begin{cases} 0 & \text{if } F_2 \text{ is inactive} \\ dz_{Ji} & \text{if the } J^{th} F_2 \text{ node is active} \end{cases} \qquad (27)$$

$$r_i = \begin{cases} u_i & \text{if } F_2 \text{ is inactive} \\ \dfrac{u_i + cdz_{Ji}}{\|u\| + \|cdz_J\|} & \text{if the } J^{th} F_2 \text{ node is active;} \end{cases} \qquad (28)$$

(ii) choice at $F_2$ (equations (13) and (15));
(iii) LTM equations (19) and (20);
(iv) $F_2$ reset if and only if $$\|r\| < \rho. \qquad (29)$$

Note that $\|x\| = 1$ and $\|u\| = 1$, and that during learning $$\|z_J\| \to \frac{\|u\|}{1-d} = \frac{1}{1-d} \qquad (30)$$

if the $J^{th}$ $F_2$ node is active.

When the $J^{th}$ $F_2$ node is active, $$\|r\|^2 = \frac{1 + 2\|cdz_J\|\cos(u, z_J) + \|cdz_J\|^2}{[1 + \|cdz_J\|]^2}. \qquad (31)$$

Figure 5:
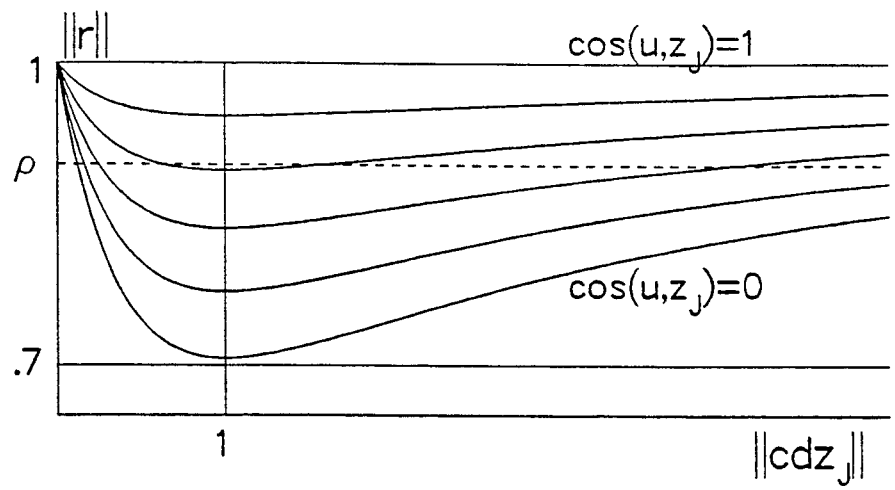
FIG. 5 graphically illustrates the norm of r of the circuit of FIG. 3 with respect to the norm of $cdz_j$.

FIG. 5 illustrates $\|r\|$ as a function of $\|cdz_J\|$ for various values of $\cos(u, z_J)$. The $J^{th}$ $F_2$ node will remain active only if $\rho \leq // r //$. Since $\rho < 1$, FIG. 5 shows that this will occur either if $\cos(u, z_J)$ is close to 1 or if $// z_J //$ is close to 0. That is, no reset occurs either if the STM vector u is nearly parallel to the LTM vector $z_J$ or if the top-down LTM traces $z_{Ji}$ are all small. By equation (19), $z_J$ becomes parallel to u during learning, thus inhibiting reset. Reset must also be inhibited, however, while a new category is being established. FIG. 5 shows that this can be accomplished by making all $// z_j //$ small before any learning occurs, that is, initial values of top-down LTM traces:

$$z_{ji}(0)=0, (i=1 \ldots N, j=M+1 \ldots N). \qquad 32$$

Condition (32) ensures that no reset occurs whenever an uncommitted $F_2$ node becomes active for the first time, and hence learning can begin. Moreover, the learning rule (19) and the initial trace rule (32) together imply that $z_j$ remains parallel to u as learning proceeds, so $// r(t) // = 1$. Thus no reset ever occurs during a trial in which an uncommitted $F_2$ node is first activated.

Finally, FIG. 5 shows that, for a given $\rho$, the system is maximally sensitive to mismatches when $// cd \; z_{Jj} // = 1$ no matter what value $\cos(u, z_J)$ might have. Equations (19) and (32) imply that $0 \leq // z_J // < 1/(1-d)$ and that $// z_J // \to 1/(1-d)$ during learning. In order to avoid the possibility of reset during learning, therefore, it is useful to require that $// cd \; z_J // 1$; i.e., $$\frac{cd}{(1-d)} \leq 1. \qquad 33$$

Moreover, the system is maximally sensitive to mismatches if equality holds in (33). In fact, by (31), at a given vigilance level, the $J^{th}$ $F_2$ node is reset shortly after activation if $\cos(u, z_J)$ is sufficiently far from 1, where u equals the STM vector established in $F_1$ by presentation of the bottom-up input, I, alone.

Figure 7A:
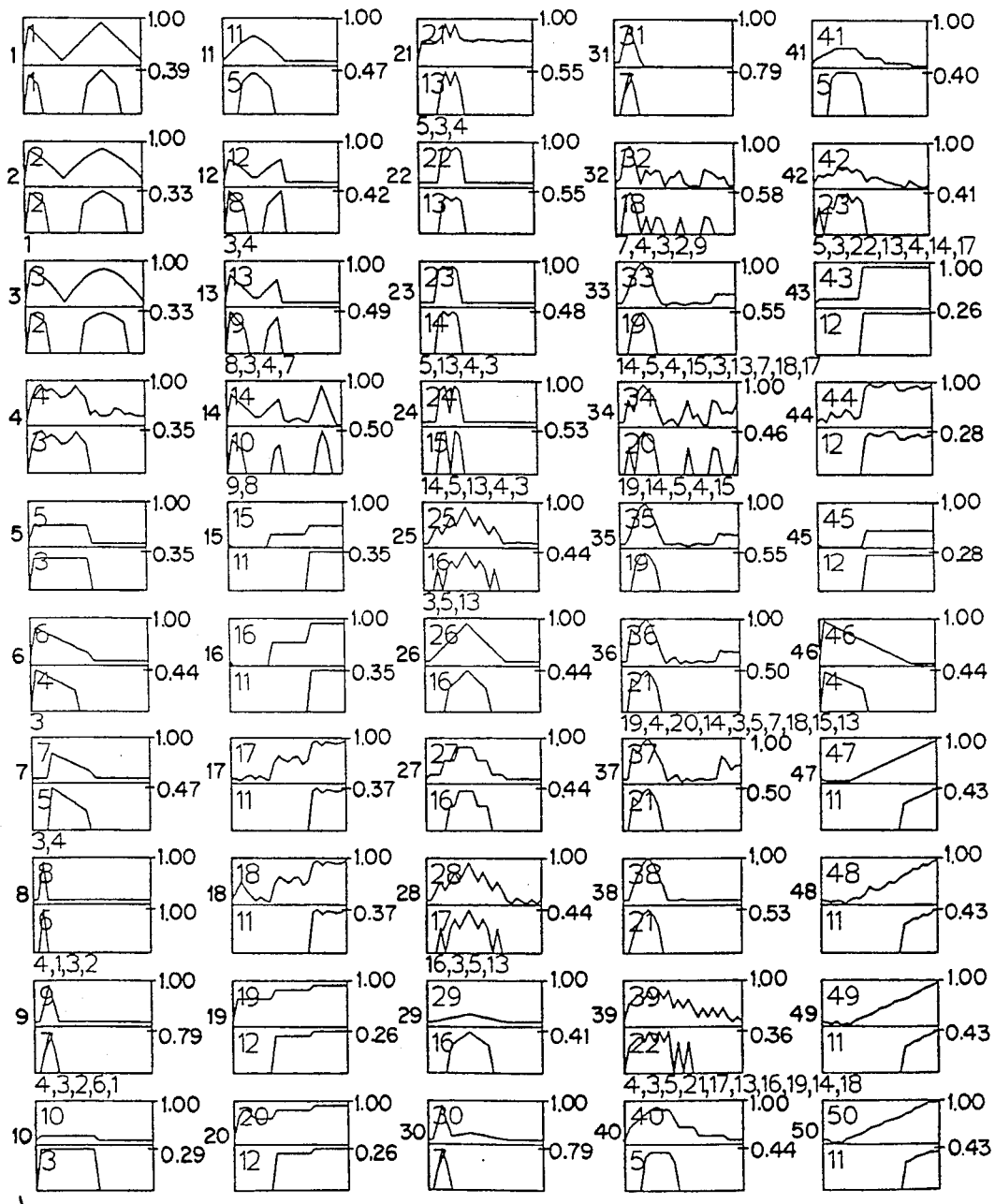
FIGS. 7A and 7B illustrate a sequence of one hundred trials in which each of the patterns of FIG. 6 is applied to the system twice.
Figure 7B:
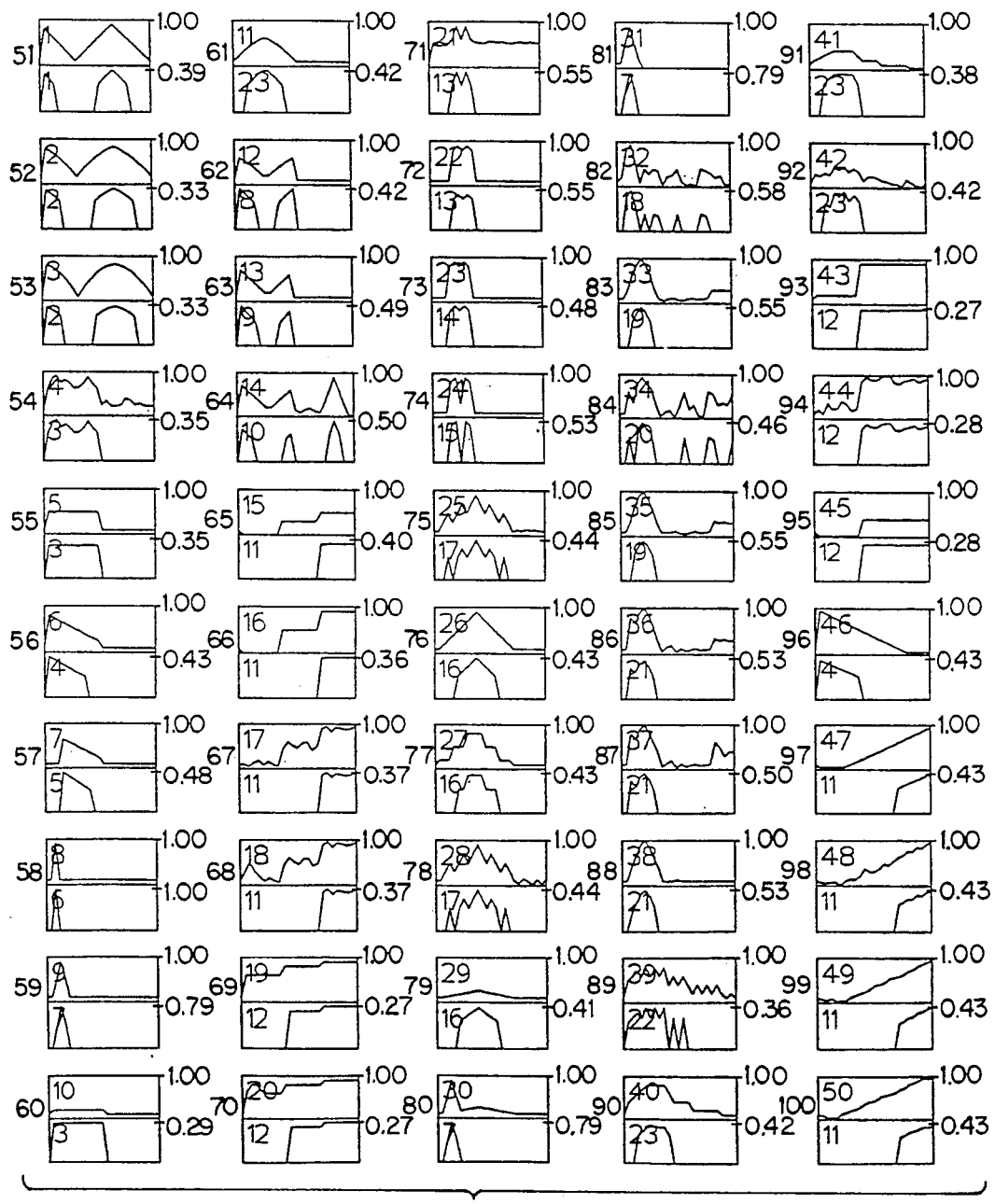

FIG. 6 illustrates another categorization by the system of the patterns of FIG. 2 but using a lower vigilance parameter. A sequence by which the categories are learned is illustrated in FIGS. 7A and 7B. In those figures, each of the 50 patterns is presented to the system in a first sequence of trials 1-50 and then again through trials 51-100. The trial numbers are indicated to the left of each box. Within each trial box, the input pattern is shown in the upper portion with a pattern number. The value to which the signals of the field $p_i$ stabilize and which are learned by the adaptive filters to the selected category during that trial are illustrated in the lower portion of the box. A category number corresponding to the selected category is also included in the lower portion of the box. Where an input does not directly access a category with which a match is found, it searches through several categories designated by the numerals below the boxes. Each category is directly accessed in each of trials 51-100; moreover, any subsequent trials of any of the input patterns 1-50 would similary result in direct access to the same categories. Also, with that same set of input patterns there would be no further learning by the adaptive filters.

An intuitive discussion of the operation will now be described, particulary with reference to FIG. 3. When a signal $I_i$ is first applied to the node $w_i$, there is no feedback from $u_i$. The signal $x_i$ therefore becomes the input signal $I_i$ normalized to other input signals. By this normalization, differences in height of like shapes due to amplification of one shape over the other are removed. Any incoming pattern would result in a signal $x_i$ which has a constant norm; in the present case that norm is 1. Thus, if input pattern 5 of category 3 in FIG. 6 had a norm of 1, pattern 10 would be amplified to the same norm of 1, and pattern 5 would remain unchanged. Note that normalization requires a specific signal for each computation of $x_i$ which is associated with a single system input as well as a nonspecific signal which is based on all signals received at all nodes of $F_1$.

The normalized signal $x_i$ is processed to provide for enhancement of larger signals and to repress lower signals which are treated as noise. Typically, the signal is processed according to either of the functions defined in equations 11 and 12. Note that for each function, any signal $x_i$ which is below a value is repressed. Using the function of equation 2, it is repressed to zero. Typically, $\theta$ is set near $1/\sqrt{m}$. Any signal $x_i$ which is below $\theta$ is repressed while other signals are passed unchanged to node $v_i$. For example, if $\theta = 1/\sqrt{m}$ and the "input mean" is defined as norm of $$\frac{\|I\|}{m},$$

then activity is repressed at those nodes whose input $I_i$ is below the input mean.

Initially, no signal is returned through the feedback path $br_i$. The signal $v_i$ therefore becomes either the normalized input signal or a repressed signal if that normalized input signal was below the input mean. The signal $v_i$ is itself normalized to provide the signal $u_i$ which is applied through a feedback path to $w_i$. In that path it is processed by the function f to again clip signals below and provide positive feedback of larger signals. This positive feedback enhances the signals which have a value greater than the input mean. The thus described loop quickly stabilizes to provide a normalized short term signal $u_i$ which is enhanced if the input $I_i$ were greater than the input mean and repressed if less than that mean. Such an enhanced signal can be seen in any of the lower portions of the trials 1-50 of FIG. 7A.

The signal $u_i$ is applied to the node $p_i$ where it is summed with the top down template signal. Initially, however, $F_2$ is inactive so there is no top down template signal, and the subfield of signals $u_i$ alone controls selection of an $F_2$ node. Note from FIG. 4 that each of the input signals is processed as just described. Each of the thus obtained signals $p_i$ is then applied through a respective weight $z_{ij}$ to each of the nodes $y_j$. The category representation which receives the strongest signal pattern from all nodes $p_i$ of $F_1$ is then selected and returns signals to each node $p_i$ through the weight $z_{Ji}$. In the simplified system being discussed, a single node $y_J$ is selected; however, in a more complex system the top down template may be a function of signals from several nodes of $F_2$ through respective weights $z_{ji}$.

Each signal $p_i$ is thus modified by the top down template. The signal $u_i$ is then subtracted from that signal to provide $q_i$. A signal $r_i$ is then derived from $q_i$ and $u_i$. The norm of all of the signals $r_i$ is then taken and compared to the vigilance parameter to determine whether the top down template provided an adequate match. If not, $F_2$ is reset, the top down signal is removed, and a second category is selected by the original subfield $p_i$. If a match is determined, $F_2$ is not reset, and the filters $z_{iJ}$ and $z_{Ji}$ are modified according to equations 17 and 18 to adapt the filters to the input. From equations 17 and 18, it can be seen that the weights are changed as a function of the difference between $p_i$ and the weights; thus, the weights are driven toward the signal $p_i$.

Note that prior to receipt of a top down template, $q_i$ is equal to 0. Thus $r_i$ is equal to the normalized $u_i$. The norm $//r//$ of the signals $r_i$ each of which is the normalization of $u_i$, is then 1 as illustrated in the upper left corner of FIG. 5 where $Z_J$ is equal to zero. Because the vigilance parameter $\rho$ is always less than or equal to one, the system assures no reset with an initial input prior to receipt of a top down signal. With receipt of a top down signal, $Z_J$ becomes nonzero, and $//r//$ moves immediately to a point on a vertical line determined by the value of $//cdz_J//$, which value is illustrated as 1 in FIG. 5. The point at which the signal is located on that vertical line is determined by the cosine $(u,z_J)$. As that cosine approaches one, $//r//$ is greater than the vigilance parameter $\rho$. If the cosine is closer to zero, however, $//r//$ may be less than $\rho$, causing a reset.

Note that the cosine function provides an indication of the angle between the vectors u and $z_J$. Thus, as the angle between the vectors approaches zero, the cosine function approaches one and a match is determined. However, if the two vectors are apart by a large angle, the cosine function approaches zero and the system resets.

FIG. 5 also illustrates how the system can assure that there is no reset where a category which has no prior learning is accessed. By initially setting all of the weights $z_{ji}$ near to zero, all signals of the field $q_i$ will be near to zero so reset will be based only on the norm of the normalized $u_i$, which norm is equal to one.

Note the feedback through path $br_i$ in a computation of $v_i$. With this feedback, a signal from a top down template is applied to the lower loop of $F_1$ and thus enhances the higher signals of the top down template and represses the lower signals of the top down template. Thus, the contrast enhancement is applied to both the incoming signal $I_i$ and the template signal through $z_{Ji}$ so that the weight which is then learned in the adaptive filters is a function of both the present input and past inputs. A significant result is that, if the $F_1$ feedback signals $af(u_i)$ and $br_i$ are strong, the system tends not to relearn signals applied to the input which have been previously discarded from a previously learned template. For example, where a signal $I_i$ is large but corresponding signal $z_{Ji}$ of a previously learned category has been set low, $cq_i$ is low but, because the overall template has been previously learned, the norm $//cq//$ is high. Thus, the numerator of equation 10 remains near the same, whereas the denominator becomes much larger, and $r_i$ is substantially reduced. Feedback of $r_i$ through the function f tends to repress the signal which is then learned at $p_i$.

A further advantage of normalization of the signal $u_i$ is that the signal $p_i$ applied through $z_{ij}$ in making the selection is itself then normalized. This prevents large weights in a few nodes from controlling access to a category previously learned from a range of smaller weights.

The system of FIG. 4 can be incorporated in more complex architectures. A neural network architecture shown in FIG. 8 can:
1) stably self-organize an invariant pattern recognition code in response to a sequence of analog or digital input patterns;
2) be attentionally primed to ignore all but a designated category of input patterns;
3) automatically shift its prime as it satisfies internal criteria in response to the occurrence of a previously primed category of input patterns;
4) learn to generate an arbitrary spatiotemporal output pattern in response to any input pattern exemplar of an activated recognition category.

This architecture exploits properties of the ART1 adaptive resonance theory architectures which have been developed in Carpenter and Grossberg, "Category learning and adaptive pattern recognition: A neural network model," *Proceedings of the Third Army Conference on Applied Mathematics and Computing*, 1985, ARO Report 86-1, 37–56, and "A massively parallel architecture for a self-organizing neural pattern recognition machine," *Computer Vision, Graphics, and Image Processing*, 1987, 37, 54–115; the ART2 architecture described here; the Boundary Contour System for boundary segmentation and the Feature Contour System for figural filling-in which have been developed in Cohen and Grossberg," Neural dynamics of brightness perception: Features, boundaries, diffusion, and resonance," *Perception and Psychophysics*, 1984, 36, 428–456, Grossberg, 1987, and Grossberg and Mingolla, "Neural dynamics of form perception: Boundary completion, illusory figures, and neon color spreading," *Psychological Review*, 1985, 92, 173–211, and "Neural dynamics of perceptual groupings: Textures, boundaries, and emergent segmentations," *Perception and Psychophysics*, 1985, 38, 141–171; Theorems on associative pattern learning and associative map learning in Grossberg, "On learning and energy-entropy dependent in recurrent and nonrecurrent signed networks," *Journal of Statistical Physics*, 1969, 1, 319–350, "Some networks that can learn, remember, and reproduce any number of complicated space-time patterns II," *Studies in Applied Mathematics*, 1970, 49, 135–166, and "Studies of mind and brain: Neural principles of learning, preception, development, cognition, and motor control," Boston: Reidel Press 1982; and circuit designs to focus attention on desired goal objects by using learned feedback interactions between external sensory events and internal homeostatic events in Grossberg, "A neural theory of punishment and avoidance, II: Quantitative theory," *Mathematical Biosciences*, 1972, 15, 253–285, "Studies of mind and brain: Neural principles of learning, perceptionn, development, cognition, and motor control," Boston: Reidel Press, 1982, and *The adaptive brain, I: Cognition, learning, reinforcement, and rhythm*, Amsterdam: Elsevier/North-Holland, 1987. The overall circuit design embodies an intentional learning machine in which distinct cognitive, homeostatic, and motor representations are self-organized in a coordinated fashion.

Figure 9:
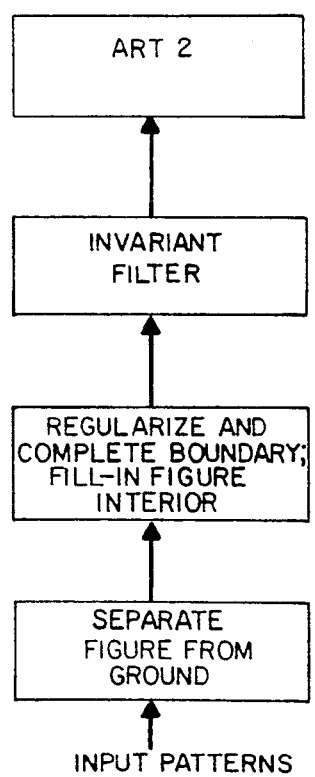
FIG. 9 illustrates the preprocessor of FIG. 8.

The ART 2 architecture of this invention stably self-organizes disjoint recognition categories in response to temporal sequences of analog or digital input patterns. A vigilance parameter can be set to determine the coarseness of this classification, thereby compensating for source of variability including noise, in the input exemplars of the emergent recognition categories. These input patterns may be the output patterns of a preprocessor stage; in particular, the preprocessor outputs may represent invariant spectra computed by one or more prior stages of input filtering (FIG. 9). The capacity of ART 2 to be activated by any number of arbitrarily chosen analog or digital input patterns without destabilizing its emergent classification provides great freedom in designing such preprocessors for specialized applications.

In the present application, the preprocessor has been designed by using available techniques to present ART 2 with spectra that are invariant under 2-D spatial translation, dilation, and rotation (Casaent and Psaltis, 1976; Cavanagh, 1978, 1984; Szu, 1986). Using an invariant input filter such as a Fourier-Mellon filter is a familiar and direct approach to achieving 2-D spatial invariance in pattern recognition. Alternative approaches use several hierarchically organized processing stages to gradually free image processing from its spatial coordinates (Fukushima, 1980; Fukushima and Miyake, 1984; Grossberg, 1978, Section 19; reprinted in Grossberg, 1982); higher-order threshold logic units (Maxwell, Giles, and Chen, 1986); or match-gated associative mechanisms (Grossberg and Kuperstein, 1986, Chapter 6).

Before the input pattern is processed by the invariant filter, the image figure to be recognized must be detached from the image background. This can be accomplished, for example, by using a range detector focussed at the distance of the figure, and detaching the figure from contiguous ground by spatially intersecting the range pattern with a pattern from another detector that is capable of differentiating figure from ground. A doppler image can be intersected when the figure is moving. The intensity of laser return can be intersected when the figure is stationary (Gschwendtner, Harney, and Hull, 1983; Harney, 1980, 1981; Harney and Hull, 1980; Hull and Marcus, 1980; Sullivan, 1980, Sullivan, 1980, 1981; Sullivan, Harney and Martin, 1979).

If the figure derived in this way is noisy and irregular, the vigilance parameter may be set at a value that adjusts for the expected level of noise fluctuations generated by the imaging devices. In addition, as in FIG. 9, the figure boundary may be extracted, completed, and regularized using the emergent boundary segmentation process of a Boundary Contour System (Grossberg and Mingolla, 1985, Grossberg, 1987). Or some portion of the Boundary Contour System can be used, such as its second competitive stage, which can choose the maximally activated oriented filter at each spatial location and inhibit responses from statistically unoriented regions. This completed boundary can then serve as the input pattern to ART 2. The figure interior within the emergent segmentation may also be smoothly completed using the filling-in process of a Feature Contour System (Cohen and Grossberg, 1984) and this filled-in representation used as an input source to ART 2. Combinations of the completed boundary and filled-in figural representations may also be chosen as the inputs to ART 2, thereby fully exploiting the architecture's self-scaling properties.

As ART 2 self-organizes recognition categories in response to these preprocessed inputs, its categorical choices at the $F_2$ classifying level self-stabilize through time. In examples wherein $F_2$ makes a choice, it can be used as the first level of an ART 1 architecture, or yet another ART architecture, should one prefer. Let us call the classifying level of this latter architecture $F_3$. Level $F_3$ can be used as a source of pre-wired priming inputs to $F_2$. Alternatively, self-stabilizing choices by $F_3$ can quickly be learned in response to the choices made at $F_2$. Then $F_3$ can be used as a source of self-organized priming inputs to $F_2$, and a source of priming patterns can be associated with each of the $F_3$ choices via mechanisms of associative pattern learning (Grossberg, 1969, 1982). For this to work well, the normalizing property of $F_3$ is important. After learning of these primes takes place, turning on a particular prime can activate a learned $F_3$ to $F_2$ top-down expectation. Then $F_2$ can be supraliminally activated only by an input exemplar which is a member of the recognition category of the primed $F_2$ node. The architecture ignores all but the primed set of input patterns. In other words, the prime causes the architecture to pay attention only to expected sources of input information. Due to the spatial invariance properties of the preprocessor, the expected input patterns can be translated, dilated, or rotated in 2-D without damaging recognition. Due to the similarity grouping properties of ART 2 at a fixed level of vigilance, suitable deformations of these input patterns, including deformations due to no more than the anticipated levels of noise, can also be recognized.

The output pathways from level $F_2$ of ART to the postprocessor (FIG. 8) can learn to read out any spatial pattern or spatiotemporal pattern of outputs by applying theorems about associative spatial pattern learning in avalanche-type circuits (Grossberg, 1969, 1970, 1982). Thus the architecture as a whole can stably self-organize an invariant recognition code and an associative map to an arbitrary format of output patterns.

The model of priming patterns can be both modified and refined. The interactions (priming to ART) and (ART to postprocessor) can be modified so that output patterns are read-out only if the input patterns have yielded rewards in the past and if the machine's internal needs for these rewards have not yet been satisfied (Grossberg, 1972, 1982, 1987; Grossberg and Levine, 1987; Grossberg and Schmajuk, 1987). In this variation of the architecture, the priming patterns supply motivational signals for releasing outputs only if an input exemplar from a desired recognition category is detected.

While this invention has been particularly shown and described with references to preferred embodiments thereof, it will be understood by those skilled in the art that various changes in form and details may be made therein without departing from the spirit and scope of the invention as defined by the appended claims. For example, although the orienting subsystem may be removed, more trials may be required for the learning sequences to self-stabilize, and some erroneous groupings may be made initially. Further, one would lose the flexibility of controlling vigilance. Also, although for some systems the $F_1$ internal feedback may be removed, certain inputs might never stabilize to a specific category. Also, the functions included in the feedback loops can be modified to provide for any desired signal enhancement and repression.

Further embodiments of the invention are described in co-pending U.S. patent application "Pattern Recognition System with Variable Selection Weights During Search and Hierarchical Architecture" filed Jan. 12, 1990, and in the following publications which are incorporated herein by reference: Carpenter and Grossberg, "ART 2: self-organization of stable category recognition codes for analog input patterns," *Applied Optics*, Vol. 26, No. 23, 12/87, 4919–4930; and Carpenter and Grossberg, "The ART of adaptive pattern recognition by a self-organizing neural network," *Computer*, 3/88, 77–88.

We claim:

1. A pattern recognition system comprising:
   a short term feature representation field of nodes storing signals of a feature pattern derived from input signals defining an input pattern, the short term input signals defining an input including means responsive to signals across the field for enhancing and repressing individual ones of said signals;

a category representation field of nodes;

long term memory storing weights;

means for selection at lest one category node of the category representation field based on a feature pattern from the short term feature representation field weighted by weights derived from long term memory; and means for resetting a category selection such that another category node is selected based on the feature pattern.

2. A pattern recognition system as claimed in claim 1 further comprising means for adapting weights stored in long term memory to the input pattern.

3. A pattern recognition system as claimed in claim 1 further comprising means for generating a long term memory template, based on a selected category, to be matched against the input pattern.

4. A pattern recognition system as claimed in claim 3 further comprising means for adapting the long term memory template to the input signals.

5. A pattern recognition system comprising:

a short term feature representation field of nodes storing signals of a feature pattern derived from input signals defining an input pattern and template signals defining a long term memory template, the short term feature representation field including means responsive to signals across the field for enhancing and repressing individual ones of said signals;

a category representation field of nodes;

means for selecting at least one category of the category representation field based on a feature pattern from the short term feature representation field;

means for generating the long term template based on the at least one selected category; and means for adapting category selection and the long term memory template to the input signals.

6. A pattern recognition system as claimed in claim 5 wherein at least one category is selected based on a pattern from the short term feature representation field weighted by weights derived from long term memory, the system further comprising means for resetting a category selection such that another category node is selected based on the feature pattern.

7. A pattern recognition system comprising:

a short term feature representation field of networks of computational nodes storing signals of a feature pattern derived from input signals defining an input pattern, each network storing short term signals based on and specific to an input signal;

a category representation field of nodes;

long term memory storing weights;

means for selecting at least one category node of the
· category representation field based on a feature pattern from the short term feature representation field weighted by weights derived from long term memory; and means for resetting a category selection such that another category node is selected based on the feature pattern.

8. A pattern recognition system as claimed in claim 7 further comprising means for adapting weights set by long term memory to the input pattern.

9. A pattern recognition system as claimed in claim 7 further comprising means for generating a long term memory template, based on a selected category, to be matched against the input pattern.

10. A pattern recognition system as claimed in claim 9 further comprising means for adapting the long term memory template to the input signals.

11. A pattern recognition system comprising:

a short term feature representation field of networks of computational nodes storing signals derived from input signals defining an input pattern and template signals defining a long term memory template, each network storing short term signals based on and specific to an input signal;

a category representation field of nodes;

means for selecting at least one category node of a category representation field based on a feature pattern from the short term feature representation field;

means for generating the long term template based on the at least one selected category; and means for adapting category selection and the long term memory template to the input signals.

12. A pattern recognition system as claimed in claim 11 wherein at least one category is selected based on a pattern from the short term feature representation field weighted by weights derived from long term memory, the system further comprising means for resetting a category selection such that another category node is selected based on the feature pattern.

13. In a pattern recognition device comprising:

a short term feature representation field of nodes storing signals derived from input signals defining an input pattern and template signals defining a long term memory template, a category representation field of nodes;

means for selecting at least one category node of the category representation field based on a feature pattern from the short term feature representation field, means for generating the long term template based on a selected category, means for adapting category selection and the long term memory template to the input signals, and means for resetting a category selection, such that another category is selected based on the feature pattern, with an insufficient match between the input pattern and template, the improvement wherein the short term feature representation field comprises networks of computational nodes, each network storing short term signals based on and specific to an input signal ($I_i$).

14. A method of pattern recognition comprising:

storing signals of a feature pattern in a short term feature representation field of nodes, the signals being derived from input signals defining an input pattern and individual ones of such signals being enhanced and repressed responsive to signals across the field;

storing weights in long term memory;

selecting at least one category node of a category representation field based on a feature pattern from the short term feature representation field weighted by weights derived from long term memory; and resetting a category selection such that another category node is selected based on the feature pattern.

15. A method as claimed in claim 14 further comprising adapting weights stored in long term memory to the input pattern.

16. A method as claimed in claim 14 further comprising generating a long term memory template, based on a selected category, and matching the long term memory template against an input pattern.

17. A method as claimed in claim 16 further comprising adapting a long term memory template to the input signals.

18. A method of pattern recognition comprising:
storing feature signals of a feature pattern derived from input signals defining an input pattern and template signals defining a long term memory template and enhancing and repressing individual ones of said feature signals responsive to signals across a short term feature representation field;
selecting at least one category of a category representation field based on a feature pattern from the short term feature representation field;
generating the long term template based on the at least one selected category; and
adapting category selection and the long term memory template to the input signals.

19. A method of pattern recognition as claimed in claim 18 further comprising selecting the at least one category based on a pattern from the short term feature representation field weighted by weights derived from long term memory and resetting a category selection such that another category node is selected based on the feature pattern.

20. A method of pattern recognition comprising storing feature signals of a feature pattern derived from input signals defining an input pattern in a short term representation field of networks of computational nodes, each network storing short term signals based on and specific to an input signal;
storing weights in long term memory;
selecting at least one category node of a category representation field based on a feature pattern from the short term feature representation field weighted by weights derived from long term memory; and
resetting a category selection such that another category node is selected based on the feature pattern.

21. A method as claimed in claim 20 further comprising adapting weights set by long term memory to the input pattern.

22. A method as claimed in claim 20 further comprising generating a long term memory template, based on a selected category and matching the long term memory template against the input pattern.

23. A method as claimed in claim 22 further comprising adapting the long term memory template to the input signals.

24. A method of pattern recognition comprising:
storing signals derived from input signals defining an input pattern and template signals defining a long term memory template in a short term feature representation field of networks of computational nodes, each network storing short term signals based on and specific to an input signal;
selecting at least one category node of a category representation field based on a feature pattern from the short term feature representation field;
generating the long term template based on the at least one select category; and
adapting category selection and the long term memory template to the input signals.

25. A method as claimed in claim 24 further comprising selecting the at least one category based on a pattern from the short term feature representation field weighted by weights derived from long term memory and resetting a category selection such that another category node is selected based on the feature pattern.

26. A method of pattern recognition comprising:
·storing signals derived from input signals defining an input pattern and template signals defining a long term memory template in a short term feature representation field of nodes;
selecting at least one category node of a category representation field based on a feature pattern from the short term representation field;
generating the long term template based on a selected category;
adapting category selection and the long term memory template to the input signals; and
resetting a category selection such that another category is selected based on the feature pattern with an insufficient match between the input pattern and long term memory template;
the improvement comprising storing signals of the feature representation field in networks of computational nodes, each network storing short term signals based on and specific to an input signal.

* * * * *

UNITED STATES PATENT AND TRADEMARK OFFICE
CERTIFICATE OF CORRECTION

PATENT NO.   :   5,133,021
DATED        :   July 21, 1992
INVENTOR(S)  :   Gail Carpenter and Stephen Grossberg It is certified that error appears in the above-identified patent and that said Letters Patent is hereby corrected as shown below:

In Claim 1, column 14, line 67, change "input signals defining an input" to ---feature representation field---.

In Claim 1, column 15, line 5, change "selection at lest" to ---selecting at least---.

Signed and Sealed this

Tenth Day of August, 1993

Attest:

MICHAEL K. KIRK

*Attesting Officer*    Acting Commissioner of Patents and Trademarks

UNITED STATES PATENT AND TRADEMARK OFFICE
CERTIFICATE OF CORRECTION

PATENT NO. : 5,133,021
DATED : July 21, 1992
INVENTOR(S) : Gail A. Carpenter and Stephen Grossberg It is certified that error appears in the above-indentified patent and that said Letters Patent is hereby corrected as shown below:

In column 1, line 14, after "(S.G.))," insert --and the Department of the Navy, Grant N00014-91-J-4100--.

Signed and Sealed this

Twenty-fourth Day of December, 1996

Attest:

BRUCE LEHMAN

*Attesting Officer*     *Commissioner of Patents and Trademarks*